US012553259B2

(12) United States Patent
Alvarado et al.

(10) Patent No.: US 12,553,259 B2
(45) Date of Patent: Feb. 17, 2026

(54) REDUCED-FRICTION LATCH BOLT

(71) Applicant: dormakaba USA Inc., Indianapolis, IN (US)

(72) Inventors: Juan Alvarado, Indianapolis, IN (US); Jeromy Higgins, Indianapolis, IN (US)

(73) Assignee: dormakaba USA Inc., Indianapolis, IN (US)

( * ) Notice: Subject to any disclaimer, the term of this patent is extended or adjusted under 35 U.S.C. 154(b) by 33 days.

(21) Appl. No.: 18/605,022

(22) Filed: Mar. 14, 2024

(65) Prior Publication Data

US 2025/0027336 A1 Jan. 23, 2025

Related U.S. Application Data

(60) Provisional application No. 63/527,102, filed on Jul. 17, 2023.

(51) Int. Cl.

| | |
|---|---|
| ***E05B 17/00*** | (2006.01) |
| ***E05B 15/02*** | (2006.01) |
| ***E05B 65/10*** | (2006.01) |
| ***E05C 3/00*** | (2006.01) |

(52) U.S. Cl.

CPC ........ *E05B 17/007* (2013.01); *E05B 15/0205* (2013.01); *E05B 17/002* (2013.01); *E05B 65/1006* (2013.01); *E05C 3/006* (2013.01)

(58) Field of Classification Search

CPC .... E05B 17/007; E05B 17/08; E05B 17/0041; E05B 17/0045; E05B 65/10; E05B 65/1006; E05C 3/006

See application file for complete search history.

(56) References Cited

U.S. PATENT DOCUMENTS

| | | | | |
|---|---|---|---|---|
| 3,487,667 A * | 1/1970 | Armstrong | E05C 1/163 | 70/464 |
| 3,582,122 A * | 6/1971 | Foster | E05B 63/20 | 292/DIG. 21 |
| 3,767,239 A * | 10/1973 | Horgan, Jr. | E05B 65/1013 | 70/151 R |
| 3,788,687 A * | 1/1974 | Zawadzki | E05B 63/20 | 292/92 |
| 4,819,976 A * | 4/1989 | Bert | E05B 65/104 | 292/48 |
| 5,816,017 A * | 10/1998 | Hunt | E05B 65/1046 | 52/784.11 |

(Continued)

FOREIGN PATENT DOCUMENTS

| | | |
|---|---|---|
| CN | 204152315 U * | 2/2015 |
| DE | 3118935 A1 * | 12/1982 |

(Continued)

*Primary Examiner* — Christine M Mills
*Assistant Examiner* — Faria F Ahmad
(74) *Attorney, Agent, or Firm* — Faegre Drinker Biddle & Reath LLP

(57) ABSTRACT

A door assembly includes a frame including a strike member, the strike member including a first coating having a first material and a door hingedly coupled to the frame, the door including a latch member operable to engage with the strike member to secure the door in a closed position, the latch member including a second coating having a second material, the second material being different than the first material.

20 Claims, 6 Drawing Sheets

(56) References Cited

U.S. PATENT DOCUMENTS

| | | | | | |
|---|---|---|---|---|---|
| 6,641,183 | B2 * | 11/2003 | Brown | E05B 65/1013 70/92 |
| 7,896,407 | B2 * | 3/2011 | Di Vinadio | E05B 65/1013 292/93 |
| 8,474,885 | B2 * | 7/2013 | Lu | E05C 9/1875 292/195 |
| 2011/0198869 | A1 * | 8/2011 | Lu | E05C 9/1875 292/195 |
| 2011/0198871 | A1 * | 8/2011 | Lu | E05B 63/12 292/195 |
| 2015/0330120 | A1 * | 11/2015 | Hogan | E05B 47/0012 292/138 |
| 2020/0277813 | A1 * | 9/2020 | Schaeffer | E05B 15/10 |

FOREIGN PATENT DOCUMENTS

| | | | | |
|---|---|---|---|---|
| DE | 3244276 A1 * | 5/1984 | |
| EP | 0491486 B1 * | 5/1995 | E05B 65/1066 |
| EP | 0651120 A2 * | 5/1995 | E05B 65/1053 |
| EP | 0861956 | 5/2002 | |
| EP | 3138979 | 4/2019 | |

* cited by examiner

REDUCED-FRICTION LATCH BOLT

CROSS-REFERENCE TO RELATED APPLICATIONS

The present application claims the benefit of and priority to U.S. Provisional Application Ser. No. 63/527,102, filed on Jul. 17, 2023, entitled REDUCED-FRICTION LATCH BOLT, which hereby is incorporated by reference in its entirety for all purposes

FIELD

The present disclosure relates to an assembly for a latch bolt for reduced friction during operation. More specifically, a latch bolt and strike plate assembly with debris reduction are provided for a door assembly.

BACKGROUND

Latch bolts are implemented to secure doors in a closed position. Latch bolts may be implemented in both horizontal and vertical directions. The latch bolts are susceptible to accumulating debris which increases friction between latch bolts and strike plates. This is especially true with respect to panic devices, and specifically, vertical rods, which require significant force to open the door. This is caused, in part, by the relationship between the latch bolt and the strike with which it comes in contact. Increased friction results in higher forces required to unlatch the latch bolt during opening of a door assembly. Additionally, the contact between the latch bolt and the strike results in wear over time, which creates debris, causes additional frictions, and results in accelerated wear.

SUMMARY

The present disclosure provides a door assembly including a frame having a strike member, the strike member including a coating of a first material; and a door hingedly coupled to the frame, the door including a latch member operable to engage with the strike member to secure the door in a closed position, the latch member including a coating of a second material, the second material being different than the first material. In an example thereof, the first material is nylon. In another example, the second material is polytetrafluoroethylene. In a further example, the first material is nylon, and the second material is polytetrafluoroethylene. In another example, the first material and the second material are operable to limit a decibel level when operating the door assembly to about 60 decibels or less. In another example, the assembly includes a debris removal member operable to remove debris from an active surface of the latch member, wherein the debris removal member is positioned to contact at least a portion of the active surface of the latch member. In another example the debris removal member includes a lubricant. In another example, the debris removal member contacts a portion of the active surface of the latch member as the latch member moves from a latched position to an unlatched position. In another example, the debris removal member is a brush. In another example, the brush includes a plurality of bristles. In another example, the strike member includes an edge positioned to contact the active surface to during a cycle of the latch member, wherein the edge is operable to remove debris accumulated on the active surface.

Another aspect of the present disclosure relates to a latch assembly for a door including a strike member including a first coating having a first material and a latch bolt including a second coating having a second material, the second material being different than the first material. In another example, the first material and the second material have an RA value of 30 or less.

Another aspect of the present disclosure relates latch assembly for a door including a strike member operable to be coupled to a frame of a door, a latch bolt assembly including a latch member operable to selectively contact the strike member for securing the door in a closed position, wherein the latch member includes an active surface along which the latch member contacts the strike member; and a debris removal member operable to remove debris from the active surface of the latch member, wherein the debris removal member is positioned to contact at least a portion of the active surface of the latch member during operation of the latch bolt assembly. In an example thereof, the debris removal member of the latch assembly includes a lubricant. In an example thereof, the debris removal member contacts the portion of the active surface of the latch member as the latch member moves from the latched position to the unlatched position. In an example thereof, the debris removal member is a brush. In an example thereof, the brush includes a plurality of bristles. In another example, the strike member includes an edge positioned to contact the active surface to during a cycle of the latch member, wherein the edge is operable to knock of debris accumulated on the active surface. In another example, the debris removal member is positioned on the strike member.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the disclosure in any manner.

DETAILED DESCRIPTION

Figure 1:
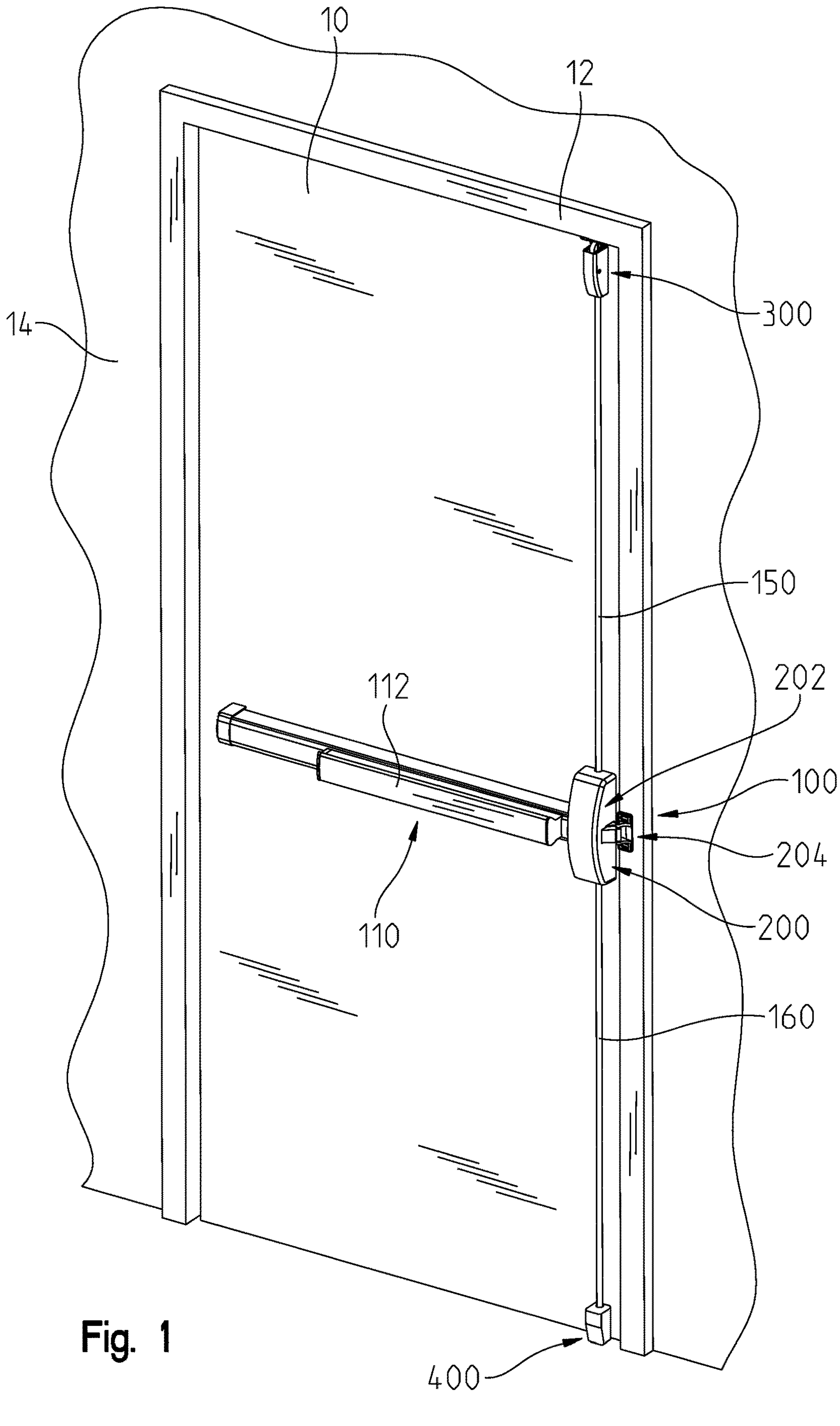
FIG. 1 shows a perspective view of a door having an exit device assembly of the present disclosure.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features. The term couple is understood to include either direct or indirect coupling.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

The present disclosure relates to latches used for securing products such as doors to frames in an environment, such as a building, which reduce the friction between the latch and a strike coupled to the frame during repeated use. Although doors are discussed throughout, it is understood that the latches discussed herein may be implemented in a variety of settings in which one component is to be secured to another. In the embodiments discussed herein, the friction between the latch and the strike is reduced as compared to typical systems, the reduced friction facilitating disengagement of the latch from the strike plate with a reduced level of force as compared to typical systems. The embodiments disclosed herein reduce friction and provide for reduced wear over cycles, which also increases longevity of the device. The embodiments disclosed herein provide for consistent levels of friction over a long period of a life cycle of a latch system. The embodiments disclosed herein provide for reduced noise levels generated from cycling the latch and engaging the latch with the strike plate.

FIG. 1 illustrates an embodiment of an egress point including door frame 12 defining an opening through wall 14 allowing pedestrian egress therethrough, door 10 connected to door frame 12 (e.g., via door hinges) and rotatable between the closed position shown in FIG. 1 blocking egress through door frame 12 and an open position allowing egress through door frame 12. An exit device assembly 100 is carried by door 10. Details regarding exemplary exit device assemblies are provided in U.S. patent application Ser. No. 18/107,226, titled EXIT DEVICE ASSEMBLY US; U.S. patent application Ser. No. 18/107,211, titled EXIT DEVICE ASSEMBLY US; and U.S. patent application Ser. No. 18/107,223, titled EXIT DEVICE ASSEMBLY US, the entire disclosures of which are expressly incorporated by reference herein.

Door 10 may have a height nominally equal to that of a general pedestrian traffic door. While door 10 and door frame 12 can also selectively allow ingress, FIG. 1 is said to illustrate an egress point because exit device is actuatable from an interior to allow egress through door frame 12. In various alternative embodiments, door frame 12 could be configured to hold a single door or a plurality of doors. Door frame 12 includes two (left and right) generally vertical frame members connected by an upper frame member. The "vertical" frame members of the present disclosure are nominally vertical in the context of a door installation. That is, a "vertical" frame member may not be exactly plumb but will appear vertical or nearly vertical (within 0-2.5 degrees of plumb) to an observer.

An embodiment of an exit device assembly 100 is illustrated in FIG. 1 is not intended to be limiting to the scope of the disclosure and is only provided as one example of various examples of exit device assemblies that may be implemented with the various components disclosed herein. Exit device 100 is operable to transition door 10 between the closed position illustrated in FIG. 1 and an open position allowing ingress and egress through door frame 12. Exit device assembly 100 is operable between a latched position that corresponds to retaining door 10 in the closed position and an unlatched position that corresponds to allowing door 10 to be transitioned from the closed position into the open position. Exit device assembly 100 includes input device 110 with input 112 that actuates exit device assembly 100 between the latched position and the unlatched position allowing a user to transition the door 10 from a closed position to an open position. In various embodiments, the input device 110 of the exit device assembly 100 is a touch bar input that receives a user touch in the form of a push on push bar 112 that translates push bar 112 toward door 10. Exit device assembly 100 includes latch assemblies 20 that are operable to retain door 10 in the closed position when engaged and when disengaged allows door 10 to be transitioned to the open position.

Input device 110 is operatively coupled to door 10 and to intermediate transmission assembly 200. Input device 110 operates intermediate transmission assembly 200 in a way that actuates the exit device assembly 100 between the latched position and unlatched position. Accordingly, intermediate transmission assembly 200 is operatively connected to upper latch assembly 300 through upper vertical rod 150. Further, intermediate transmission assembly 200 is connected to lower latch assembly 400 through lower vertical rod 160. Both upper vertical rod 150 and lower vertical rod 160 are substantially vertical. The "vertical" rods of the present disclosure are nominally vertical in the context of a door installation. That is, a rod need not be precisely plumb to be considered a vertical rod but will appear vertical or nearly vertical (within 0-2.5 degrees of plumb) to an observer.

Intermediate assembly 200, in some embodiments, may include intermediate latch assembly 204 operable to contact a frame, mullion, astragal, or second door, to retain door 10 in the closed position when latch is engaged. Intermediate assembly 200 may also transmit a translational movement of input device 110 to disengage components of upper latch assembly 300 and/or lower latch assembly 400. In one non-limiting example, intermediate transmission assembly 200 transmits a translation movement into a rotational or translational output for actuation of the latch assemblies 20 in one or both of upper latch assembly 300 and lower latch assembly 400. In one non-limiting example, intermediate transmission assembly 200 transmits a translation movement into a rotational output for actuation of the latch assemblies 20 in one or both of upper latch assembly 300 and lower latch assembly 400. Upper vertical rod 150 and lower vertical rod 160 are operably coupled to intermediate assembly 200 and rotate in response to the actuation of intermediate assembly 200 by push bar 112. Upper vertical rod 150 is coupled with upper latch assembly 300. It is understood the intermediate assembly 200 may transmit movement of input device 100 in any number of ways in order to disengage latch assemblies 20.

Figure 2:
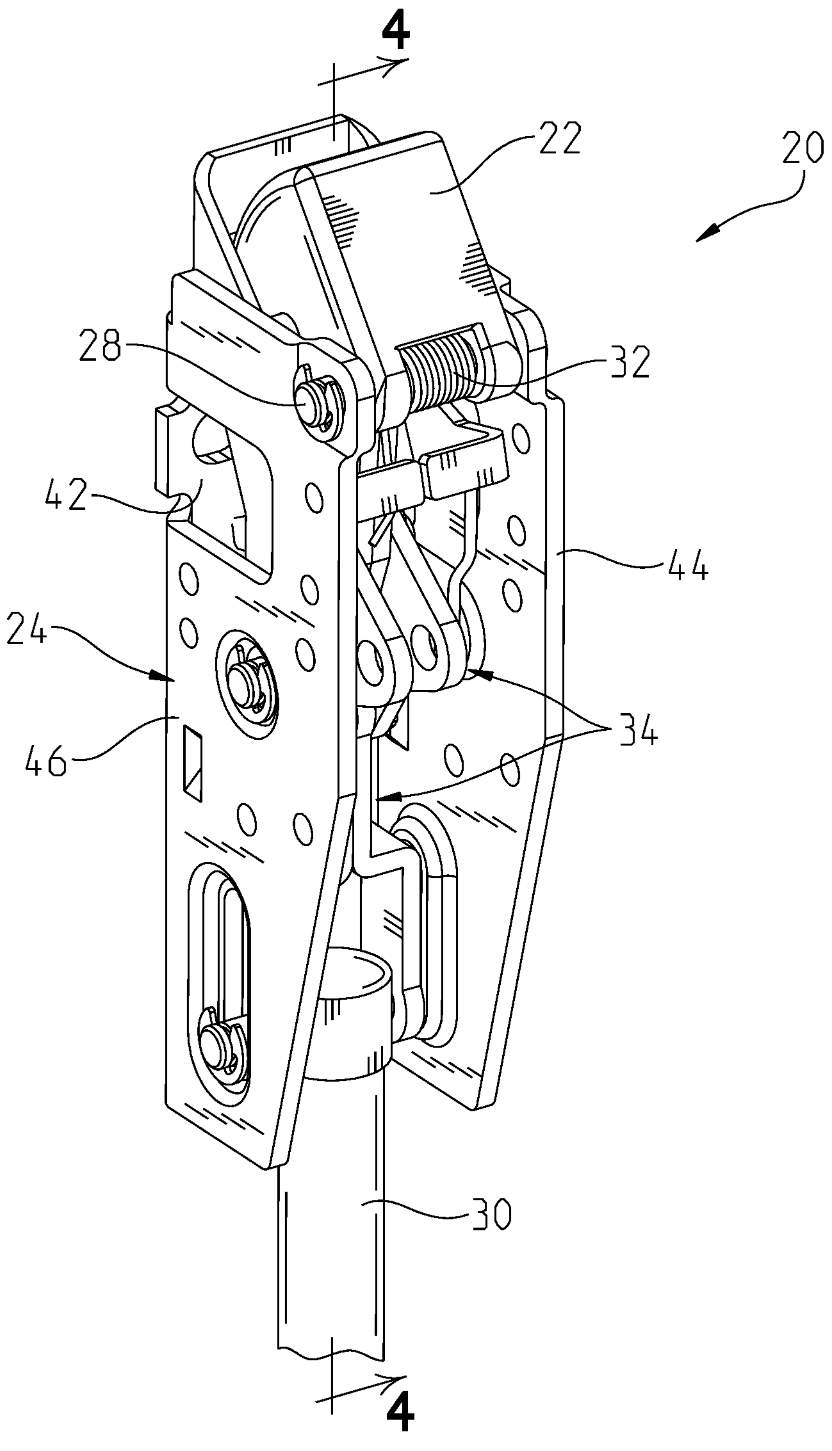
FIG. 2 is a perspective view of a latch that may be implemented with a door, including the door of FIG. 1, according to an embodiment.

Referring to FIG. 2, an exemplary latch assembly 20 for upper latch assembly 300 is shown and includes a latch member 22 positioned in a latch housing 24. The aspects of latch assembly 20 described herein for reducing friction and debris presence may also be applied to the respective intermediate latch assembly 204 and/or lower latch assembly 400. Latch member 22 is operable to rotate out of engagement with a strike plate 26 (see FIGS. 6 and 7) in response to rotation of upper vertical rod 150. In some embodiments, latch member 22 may be in the form of a bolt. In some embodiments, latch member 22 pivots in and some embodiments latch member 22 translates substantially linearly relative to a receiver (not shown).

Latch member 22 is movably coupled to latch housing 24. In the embodiment depicted in FIG. 2, latch member 22 is operable to transition between a latched and an unlatched position (see FIGS. 6 and 7) relative to strike plate 26. In some embodiments, latch member 22 is pivotable about a pin 28 that extends through a portion of latch member 22 and latch housing 24, thus facilitating rotatable movement of latch member 22 relative to pin 28 and latch housing. In one embodiment, latch member 22 rotates between the latched and the unlatched position, wherein an actuator 30 controls the position of latch member 22. Latch member 22 may also be positioned proximate and contacted by a spring 32 that exerts a force on latch member 22. Spring 32 may bias latch member 22 toward the latched position. In some embodiments, spring 32 may be positioned about pin 28.

Figure 3:
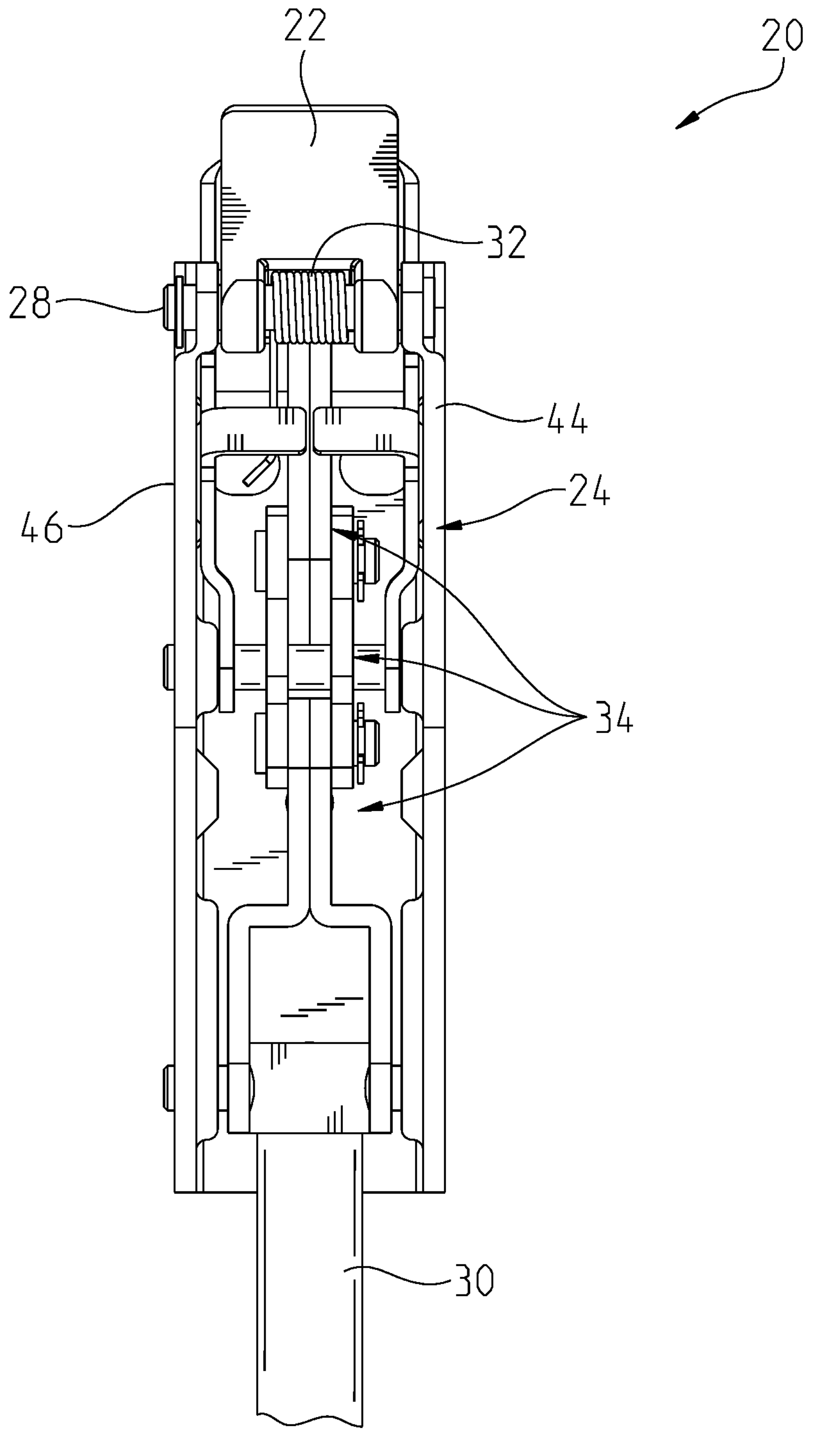
FIG. 3 is front view of the latch of FIG. 2.
Figure 4:
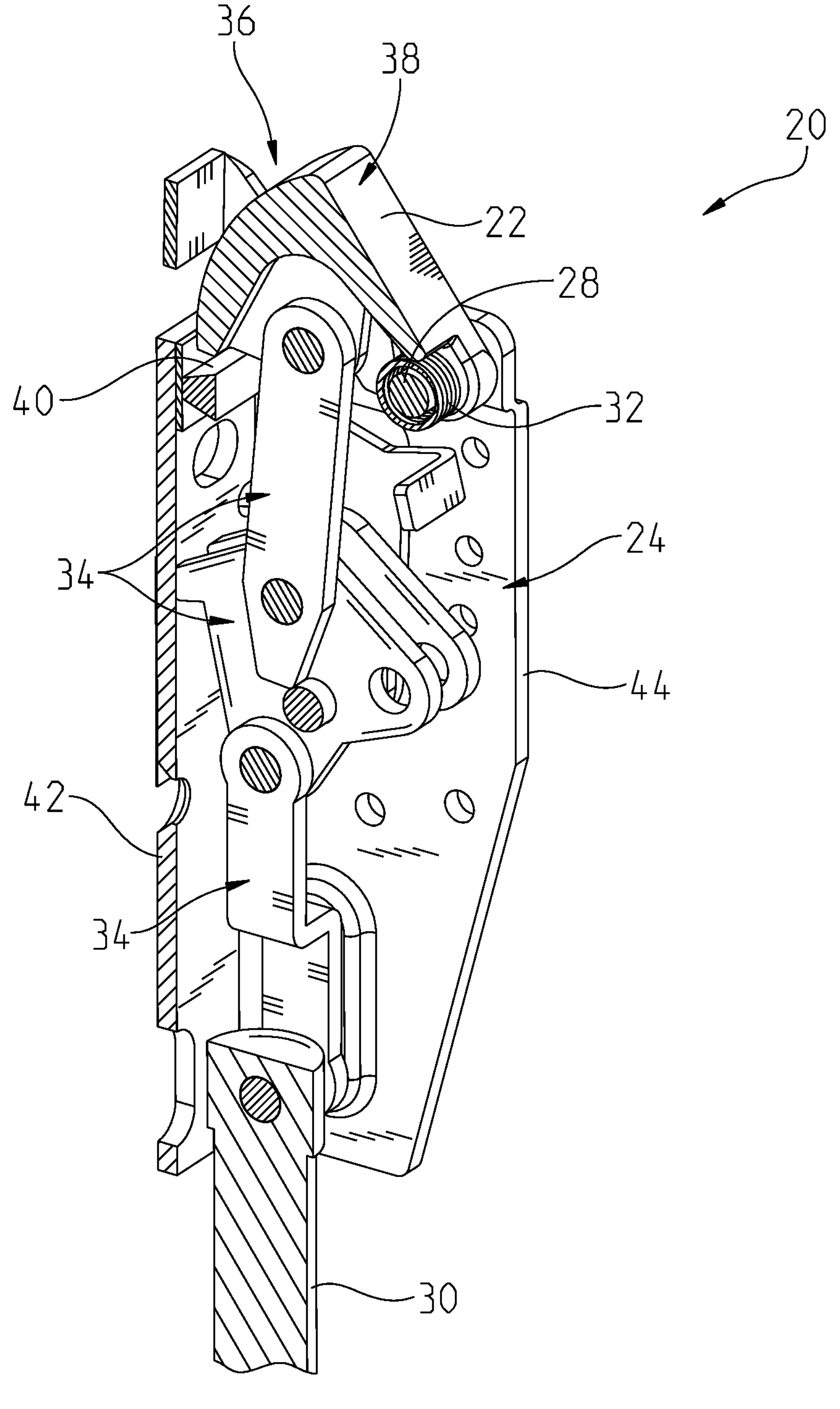
FIG. 4 is a perspective, section view the latch of FIG. 2.
Figure 5:
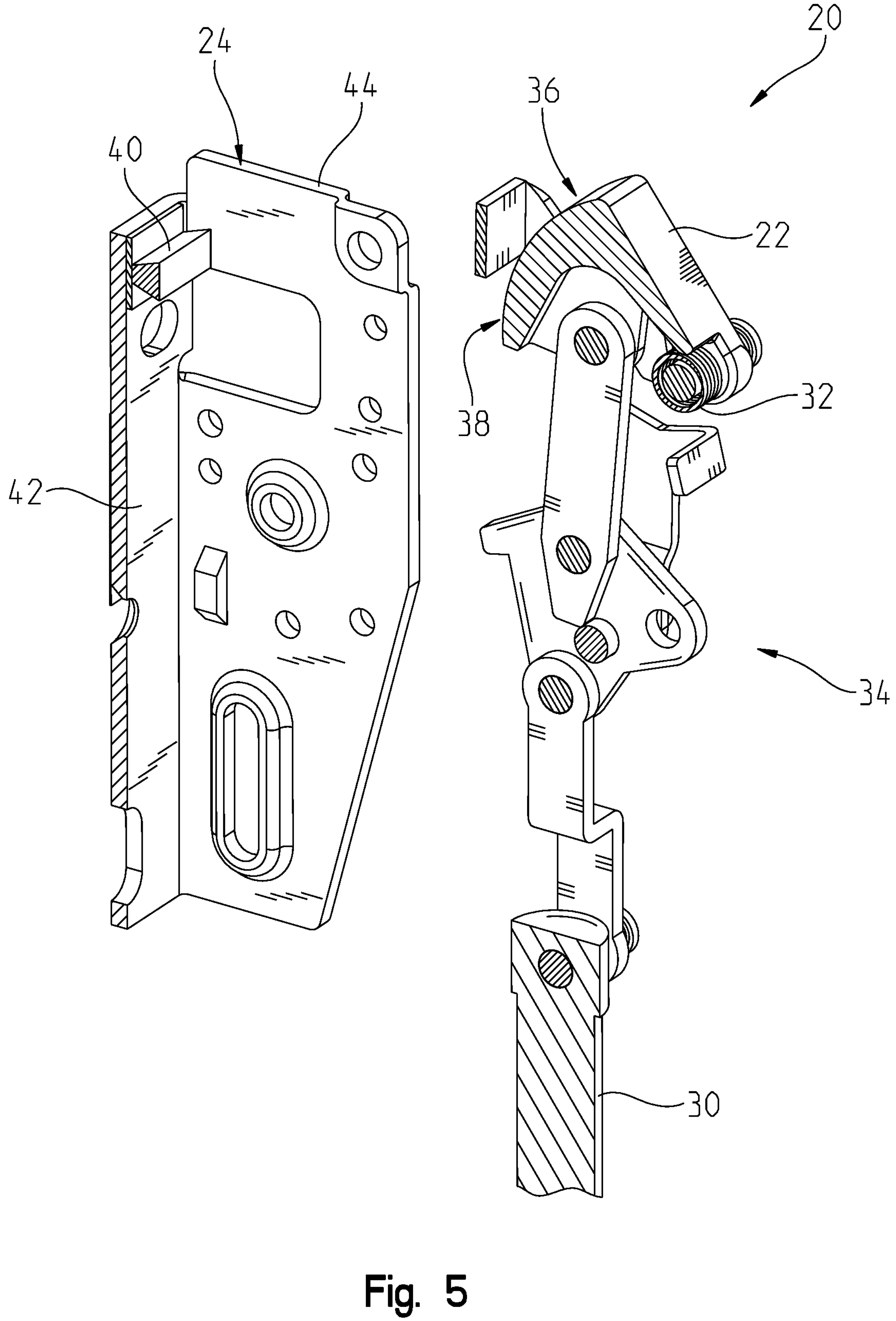
FIG. 5 is an exploded, section view of the latch of FIG. 2.

Referring to FIGS. 3 and 4, actuator 30 is shown at least partially positioned within latch housing 24. Intermediate components 34 may be implemented between actuator 30 and latch member 22 as depicted. Any number of intermediate components 34 may be implemented to transmit the movement of actuator 30 to the latch member 22 and the FIGS. and description herewith is not meant to be limiting to the scope of the application. Intermediate components 34 may be provided in a number of manners and may be coupled to the latch housing 24 or otherwise to transmit the movement. In some embodiments, movement may be transmitted directly to latch member 22 without the use of any intermediate components. As actuator 30 is transitioned between a first and second condition, that movement is transmitted to latch member 22 (e.g., via the intermediate components) (see FIGS. 6 and 7), thus causing latch member 22 to transition between the latched and unlatched positions.

Figure 6:
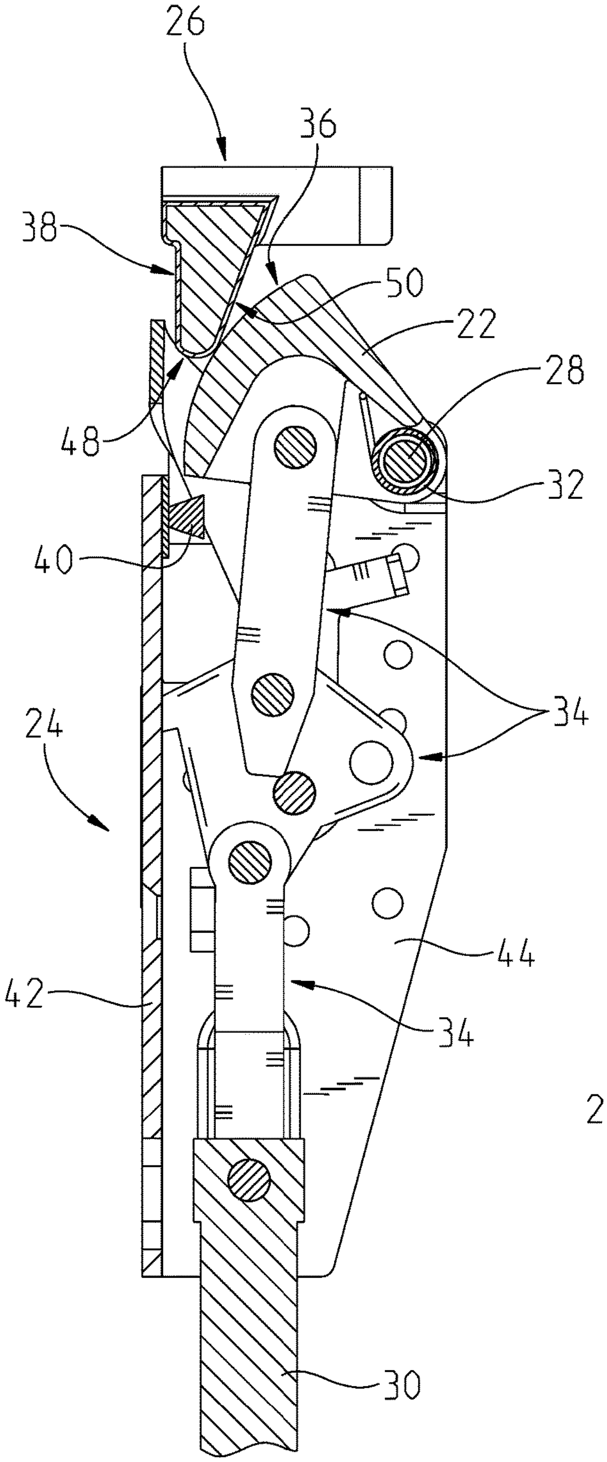
FIG. 6 is a section view of the latch of FIG. 1 with a latch member positioned in a latched position and positioned against a strike plate such that the latch member is unable to travel past the strike plate, according to an embodiment.
Figure 7:
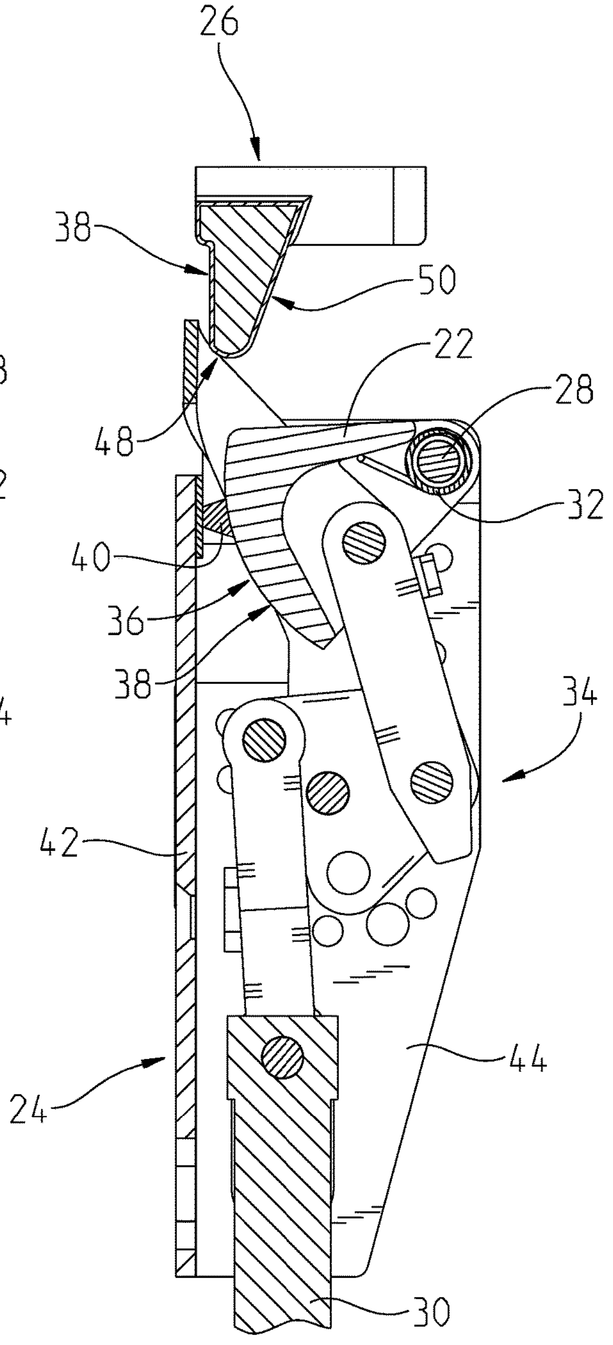
FIG. 7 is a section view of the latch of FIG. 6 with the latch member positioned in an unlatched position such that the latch member is able to travel past the strike plate, according to an embodiment.

Referring to FIGS. 6 and 7, latch assembly 20 is illustrated with at least a portion of strike plate 26. Latch member 22 is positioned in the latched position in FIG. 6 such that a portion of latch member 22 is in contact with or positioned to contact strike plate 26 when a force is applied to open the door (see FIG. 1). In some embodiments, at least a portion of latch member 22 may contact and slide along strike plate 26 when latch member 22 is transitioned between the latched and unlatched positions. This surface is considered an active surface 36.

In order to decrease both friction and wear of and between latch member 22 (i.e., active surface 36) and strike plate 26, at least a portion (e.g., active surface 36) of latch member 22 and strike plate 26 include a respective coating 38. By coating at least portions of latch member 22 and strike plate 26, the coefficient of friction between the two parts may be decreased. In some embodiments, latch member 22 and strike plate 26 may be coated in nylon. In some embodiments, latch member 22 and strike plate 26 may be dipped in nylon. In some embodiments, latch member 22 and strike plate 26 are coated with polytetrafluoroethylene (PTFE). In some embodiments, latch member 22 and strike plate 26 are coated in the same material. In some embodiments, latch member 22 and strike plate 26 are coated in different materials, the latch member 22 in a first material and the strike plate 26 in a second material. In one embodiment, latch member 22 is coated in PTFE and strike plate is dip coated in nylon. Dipped nylon and PTFE have similar tensile strengths and hardness which reduce the amount of debris formed and sluffed off when the two materials contact each other. Furthermore, both dipped nylon and PTFE reduce the surface roughness of latch member 22 and strike plate 26, thus decreasing the coefficient of friction between the components during use. For example, an example wherein latch member 22 and strike plate 26 are coated in nylon and/or PTFE have less than 20 RA value (surface roughness average). For example, when latch member 22 is dip coated in nylon, the nylon-coated surface may have from about a 10 to about a 20 RA value (e.g., about 10 RA, about 15 RA, about 20 RA, or in a range from about 10 to about 20 RA). When strike plate 26 is coated in PTFE, the PTFE-coated surface may have from about a 2 to about a 10 RA value (e.g., about 2 RA, about 4 RA, about 6 RA, about 8 RA, about 10 RA). This is a significant reduction in surface roughness of many manufactured metals. Some manufactured metals may achieve similar RA values (e.g., via polishing or other finishing processes), however, differences in tensile strength and hardness may nonetheless result in wear and abrasion between components. Thus, by coating latch member 22 and strike plate 26 in at least one of nylon and PTFE, the RA value is significantly decreased in a time and cost-effective manner (e.g., in comparison to polishing) and provides for long-term durability of those surfaces with minimal wear during use. It is understood that various other materials may be implemented to achieve similar results in addition, in combination with, or in place of nylon and PTFE, and those materials are provided only as examples. For example, other nonlimiting examples include PE, FEP, PEEK, ETFE, E-CTFE, and so forth. The scope of this disclosure is inclusive of other materials that have low RA values that have sufficient tensile strength and hardness within comparable ranges with respect to each other in order to limit abrasion (e.g., ploughing, wedging, cutting, micro-cracking, or other two- and three-body abrasion modes). In embodiments, the RA of the coating on strike plate 26 is lower than the RA of the coating on latch member 22. In examples the RA of both coatings is less than 30 RA. In some embodiments, specific materials may be implemented for thicknesses of the material when coating the latch member 22 and strike plate 26. For example, nylon may be implemented to provide a thicker coating to at least one of latch member 22 and strike plate 26 whereas PTFE may be implemented to provide a thinner coating to at least one of latch member 22 and strike plate 26. In embodiments, the coating 38 on latch member 22 is nylon and is between about 0.015 inches and about 0.025 inches thick and in one example about 0.020 inches. In embodiments, the coating 38 on strike plate 26 is PTFE and is between about 0.0020 inches and about 0.0040 inches thick and in one example about 0.0030 inches.

An advantage, among others, of using a coating on one or both strike plate 26 and latch member 22 is the described reduction in friction while providing non-moving contact surfaces between strike plate 26 and latch member 22 which satisfy windstorm requirement when door 10 is in the closed position.

In some embodiments, coating 38 may also provide vibration dampening. Vibration dampening can potentially limit abrasion and reduces produced during contact between latch member 22 and strike plate 26. For example, when latch member 22 is coated with PTFE and strike plate 26 is coated with Nylon, sound produced from contact between latch member 22 and strike plate 26 is reduced from about 6 to about 8 decibels when compared to non-coated latch member 22 and strike plate 26. For example, a non-coated assembly may produce about a 68 decibel sound as compared to a coated assembly as described which produces a sound of about 60 decibels.

During use of latch assembly 20, dirt, debris, grime, and other particles can infiltrate the components of latch assembly 20 or portions of the coating 38 on strike plate 26 may wear away each of which results in an increase in friction experienced between the components and causes greater forces to be applied in order to transition latch member 22 between the latched and unlatched positions. More specifically, dirt and debris build-up on active surface 36 can result in significant increases of friction between latch member 22 and strike plate 26 and premature wear because of increased abrasion (both two-body and three-body abrasion). In order to limit infiltration of these materials to reduce friction and limit wear of the components (which results in increased friction and debris), latch assembly 20 may be provided with a wiping member 40 to remove materials (e.g., foreign bodies) from surfaces of latch member 22.

Referring to FIGS. 4-7, wiping member 40 is provided to remove debris along at least a portion of active surface 36 of latch member 22. As latch member 22 transitions between the latched and unlatched positions, wiping member 40 is positioned such that wiping member 40 contacts at least a portion of active surface 36. Wiping member 40 may be selected from a variety of materials. For example, wiping member 40 may be selected from one of a brush with bristles, a foam brush, a gasket, a rubber wall, a plastic scraper, and so forth. In one embodiment, wiping member 40 is a brush, similar to brushes found on a window gasket with individual bristles. Wiping member 40 may be selected for at least one of an ability to consistently contact active surface 36 of latch member 22, having a low coefficient of friction, and an ability to retain and apply a lubricant to active surface 36. The bristles allow for low-friction contact with active surface 36 to remove debris. Debris can be removed and held between bristles or be knocked off by the bristles from active surface 36. The bristles may also hold and apply lubricant to active surface 36 during cycling of latch member 22. In some embodiments, wiping member 40 is a debris removal member. In some embodiments, wiping member 40 is a lubricant applicator. In some embodiments, wiping member both removes debris from and applies a lubricant on active surface 36.

Wiping member 40 may be positioned at various positions in order to contact active surface 36. Although FIGS. 4-7 illustrate certain positions, various other positions are contemplated. In some embodiments, wiping member 40 is positioned on latch housing 24. Latch housing 24 may include various walls which are proximate latch member 22. In one embodiment, latch housing 24 includes a U-shaped channel that has a first wall 42 extending between a first side wall 44 and a second side wall 46. Wiping member 40 may be positioned on or extending from first wall 42 to contact active surface 36. Although not illustrated, wiping member 40 may be positioned on or extending from at least on of first and second side walls 44, 46. Latch housing 24 may include a moveable member 52 that is positioned proximate latch member 22. Wiping member 40 may be positioned on or extending from moveable member 52. Although specific embodiments of latch housing 24 are illustrated, the disclosure is not to be unduly limited by the specific structure of latch housing or the position of wiping member 40 relative to latch housing 24. It is also understood that wiping member 40 may be positioned on other appropriate components that would allow access to and contact with active surface 36 of latch member 22. In one embodiment, wiping member 40 may be positioned on strike plate 26 such that wiping member 40 contacts active surface 36 prior to engaging strike plate 26.

In some embodiments, at least a portion of strike plate 26 is configured and positioned to remove debris from active surface 36 of latch member 22. For example, in some embodiments a portion of active surface 36 may contact an end or edge 48 of strike plate 26. Edge 48 may act to knock off debris before active surface 36 of latch member 22 contacts a corresponding active surface 50 of strike plate 26. This allows any dirt, debris, or other build-up to be knocked off of active surface 36 prior to active surface 36 of latch member 22 engaging with corresponding active surface 50 of strike plate 26. In some embodiments, wiping member 40 may knock off a portion of dirt and debris. However, in some embodiments, a portion of the dirt and debris may accumulate on one side of wiping member 40 on active surface 36. The accumulated dirt and debris on active surface 36 on the side of wiping member closer to strike plate 26 may then be knocked off by edge 48 of strike plate 26, thus allowing active surface 36 to engage with corresponding active surface 50 without the dirt and debris. Wiping member 40 may help to accumulate and loosen dirt and debris from active surface 36 such that it is more readily knocked off or removed by edge 48 of strike plate.

It is understood that multiple wiping members 40 may be implemented at various locations, which is within the scope of this disclosure. For example, a wiping member 40 may be positioned as shown in FIG. 6 and another wiping member may be positioned at or near edge 48 (not shown) to remove dirt and debris from active surface 36.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A door assembly comprising:

a frame including a strike member, the strike member including a first coating having a first material;

a door hingedly coupled to the frame, the door including a latch member operable to engage with the strike member to secure the door in a closed position, the latch member including a second coating having a second material, the second material being different than the first material; and a debris removal member operable to remove debris from an active surface of the latch member, wherein the debris removal member is positioned to contact at least a portion of the active surface of the latch member.

2. The door assembly of claim 1, wherein the first material is nylon and the second material is polytetrafluoroethylene.

3. The door assembly of claim 1, wherein the first material and the second material have an RA value of 30 or less.

4. The door assembly of claim 1, wherein the first material and the second material are operable to limit a decibel level when operating the door assembly to 60 decibels or less.

5. The latch assembly of claim 1, wherein the debris removal member includes a lubricant.

6. The latch assembly of claim 1, wherein the debris removal member contacts a portion of the active surface of the latch member as the latch member moves from a latched position to an unlatched position.

7. The latch assembly of claim 1, wherein the debris removal member is a brush.

8. The latch assembly of claim 7, wherein the brush includes a plurality of bristles.

9. The latch assembly of claim 1, wherein the strike member includes an edge positioned to contact the active surface during a cycle of the latch member, wherein the edge is operable to remove debris accumulated on the active surface.

10. A latch assembly comprising:

a strike member operable to be coupled to a frame of a door;

a latch bolt assembly including a latch member movable between an unlatched position and a latched position and wherein the latch member is operable to selectively contact the strike member in the latched position for securing the door in a closed position, wherein the latch member includes an active surface along which the latch member contacts the strike member; and a debris removal member comprising a brush and operable to remove debris from the active surface of the latch member, wherein the debris removal member is positioned to contact at least a portion of the active surface of the latch member during operation of the latch bolt assembly.

11. The latch assembly of claim 10, wherein the debris removal member includes a lubricant.

12. The latch assembly of claim 11, wherein the debris removal member contacts a portion of the active surface of the latch member as the latch member moves from the latched position to the unlatched position.

13. The latch assembly of claim 10, wherein the brush includes a plurality of bristles.

14. The latch assembly of claim 13, wherein the strike member includes an edge positioned to contact the active surface during a cycle of the latch member, wherein the edge is operable to knock off debris accumulated on the active surface.

15. The latch assembly of claim 10, wherein the debris removal member is positioned on the strike member.

16. A latch assembly comprising:

a strike member operable to be coupled to a frame of a door;

a latch bolt assembly including a latch member movable between an unlatched position and a latched position and wherein the latch member is operable to selectively contact the strike member in the latched position for securing the door in a closed position, wherein the latch member includes an active surface along which the latch member contacts the strike member; and a debris removal member positioned on the strike member and operable to remove debris from the active surface of the latch member, wherein the debris removal member is positioned to contact at least a portion of the active surface of the latch member during operation of the latch bolt assembly.

17. The latch assembly of claim 16, wherein the debris removal member includes a lubricant.

18. The latch assembly of claim 16, wherein the debris removal member contacts a portion of the active surface of the latch member as the latch member moves from the latched position to the unlatched position.

19. The latch assembly of claim 16, wherein the debris removal member is a brush.

20. The latch assembly of claim 16, wherein the strike member includes an edge positioned to contact the active surface during a cycle of the latch member, wherein the edge is operable to knock off debris accumulated on the active surface.

* * * * *